(12) United States Patent  (10) Patent No.: US 7,609,300 B2
Wu  (45) Date of Patent: Oct. 27, 2009

(54) METHOD AND SYSTEM OF ELIMINATING COLOR NOISES CAUSED BY AN INTERPOLATION

(75) Inventor: Cheng-Yu Wu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 471 days.

(21) Appl. No.: 11/408,990

(22) Filed: Apr. 24, 2006

(65) Prior Publication Data

US 2007/0035636 A1  Feb. 15, 2007

(30) Foreign Application Priority Data

Aug. 9, 2005  (TW) .............................. 94126911 A (51) Int. Cl.
  *H04N 9/73* (2006.01)
  *H04N 3/14* (2006.01)
  *G06K 9/00* (2006.01)
  *G06K 9/40* (2006.01)
(52) U.S. Cl. .................... 348/223.1; 348/273; 382/162; 382/164; 382/262; 382/264
(58) Field of Classification Search ............. 348/223.1, 348/225.1, 210.99, 237, 266, 268, 270, 272, 348/273, 275, 241, 182, 444, 450, 453; 382/272, 382/275, 262, 264, 254, 260, 162, 149, 300, 382/167; 359/512, 515, 518
See application file for complete search history.

(56) References Cited

U.S. PATENT DOCUMENTS

| | | | | |
|---|---|---|---|---|
| 4,724,395 A | * | 2/1988 | Freeman | 327/93 |
| 4,774,565 A | * | 9/1988 | Freeman | 348/242 |
| 5,778,106 A | * | 7/1998 | Juenger et al. | 382/275 |
| 6,091,862 A | * | 7/2000 | Okisu | 382/300 |
| 6,404,918 B1 | * | 6/2002 | Hel-or et al. | 382/167 |
| 6,731,806 B1 | * | 5/2004 | Gindele | 382/205 |
| 6,958,772 B1 | * | 10/2005 | Sugimori | 348/222.1 |
| 7,016,549 B1 | * | 3/2006 | Utagawa | 382/261 |
| 7,102,669 B2 | * | 9/2006 | Skow | 348/222.1 |
| 7,362,897 B2 | * | 4/2008 | Ishiga | 382/167 |
| 2002/0001409 A1 | * | 1/2002 | Chen et al. | 382/167 |
| 2004/0196395 A1 | * | 10/2004 | Lee | 348/272 |
| 2005/0285968 A1 | * | 12/2005 | Sugimori | 348/345 |
| 2006/0088211 A1 | * | 4/2006 | Kusakabe et al. | 382/167 |
| 2007/0009172 A1 | * | 1/2007 | Wu | 382/274 |
| 2008/0123950 A1 | * | 5/2008 | Matsushita et al. | 382/167 |

\* cited by examiner

*Primary Examiner*—Lin Ye
*Assistant Examiner*—Marly Camargo
(74) *Attorney, Agent, or Firm*—Bacon & Thomas, PLLC

(57) ABSTRACT

A method and system of eliminating color noises caused by an interpolation, which performs an interpolation on a Bayer image obtained by an image sensor to restore red, green and blue colors of each pixel. Interpolated image is converted into a chromatic domain in order to rapidly use chroma pixel values of a pixel previously processed to eliminate color noises to update the original chroma pixel values in a median filter with 3×3 area of 2D, thereby increasing the color noise filtering capability of the median filter, and a low-pass filter is used to further eliminate the uneven effect of clustered color noises filtered out by the median filter.

11 Claims, 7 Drawing Sheets

Bayer image

| X | X | X |
|---|---|---|
| X | X | X |
| X | X | X |

| 135 | 140 | 163 |
|---|---|---|
| 157 | 160 | 155 |
| 150 | 142 | 140 |

FIG. 6A

| $X^{row1}_{min}$ | $X^{row1}_{mid}$ | $X^{row1}_{max}$ |
|---|---|---|
| $X^{row2}_{min}$ | $X^{row2}_{mid}$ | $X^{row2}_{max}$ |
| $X^{row2}_{min}$ | $X^{row2}_{mid}$ | $X^{row2}_{max}$ |

| 135 | 140 | 163 |
|---|---|---|
| 155 | 157 | 160 |
| 140 | 142 | 150 |

FIG. 6B

| $Y^{col1}_{min}$ | $Y^{col2}_{min}$ | $Y^{col3}_{min}$ |
|---|---|---|
| $Y^{col1}_{mid}$ | $Y^{col2}_{mid}$ | $Y^{col3}_{mid}$ |
| $Y^{col1}_{max}$ | $Y^{col2}_{max}$ | $Y^{col3}_{max}$ |

| 135 | 140 | 150 |
|---|---|---|
| 140 | 142 | 160 |
| 155 | 157 | 163 |

FIG. 6C

| $Z^1$ | $Z^3_{mid}$ | $Z^4_{max}$ |
|---|---|---|
| $Z^2_{min}$ | $Z^5_{median}$ | $Z^8_{max}$ |
| $Z^6_{min}$ | $Z^7_{mid}$ | $Z^9$ |

| 135 | 140 | 142 |
|---|---|---|
| 140 | 150 | 160 |
| 155 | 157 | 163 |

METHOD AND SYSTEM OF ELIMINATING COLOR NOISES CAUSED BY AN INTERPOLATION

BACKGROUND OF THE INVENTION

1. Field of the Invention

The invention relates to the technical field of image processing and, more particularly, to a method and system of eliminating color noises caused by an interpolation.

2. Description of Related Art

A color image processing system essentially includes an image capturing unit, an image restoring and processing unit, an image display and an image compressor. The image capturing unit includes an image sensor, which is a sensitive device consisting of multiple photodiodes arranged in a 2D array and cooperates with a color filter array to thereby obtain a single color value for each pixel. The image restoring and processing unit applies an interpolation to each pixel for restoring red (R) color, blue (B) color and green (G) color of the pixel. The interpolation and restoration may cause obvious color spots at a boundary between white pixel and black pixel. In addition, when the image sensor is capturing source image data, the captured image data is likely to include noises, and the process of interpolation and restoration can also cause the noises to diffuse around the adjacent pixels.

A known median filter can be provided to reserve the edge information while noises are eliminated, so that an image does not appear any blur effect. Accordingly, the U.S. Pat. No. 5,778,106 uses a median filter to eliminate color noises of R-G and B-G However, the color noises caused in restoring by the interpolation appear in clusters. Therefore, a 2D median filter with a small range (such as 3×3) cannot effectively eliminate the color noises. A 2D median filter with a larger range (such as 7×7 or 9×9) can filter out the color noises but significantly increases the cost.

Therefore, it is desirable to provide an improved method and system to mitigate and/or obviate the aforementioned problems.

SUMMARY OF THE INVENTION

The object of the invention is to provide a method and system of eliminating color noises caused by an interpolation, so as to overcome the prior problem with color noises of cluster caused by an interpolation and reduce the cost of the typical 2D median filter.

According to a feature of the invention, there is provided a method of eliminating color noises of a digital image having plural pixels by producing a corrected red signal, a corrected green signal and a corrected blue signal for each pixel, the corrected red, green and blue signals generating a first corrected chroma signal and a second corrected chroma signal. The method includes the steps of: (A) receiving a target pixel and its adjacent pixels in the digital image; (B) interpolating the target pixel and the adjacent pixels to produce a red signal, a green signal and a blue signal for each of the target and adjacent pixels; (C) producing a first chroma signal and a second chroma signal based on the red signal, the green signal and the blue signal for each of the target and adjacent pixels; (D) performing a filtering process to thus produce a first filtered chroma signal and a second filtered chroma signal based on the first and second chroma signals of the target pixel, the first and second chroma signals of the adjacent pixels, and the first and second corrected chroma signals of the adjacent pixels; (E) computing the corrected red signal, the corrected green signal and the corrected blue signal for the target pixel based on the first filtered chroma signal, the second filtered chroma signal and the green signal; (F) producing the first corrected chroma signal and the second corrected chroma signal for the target pixel based on the corrected red signal, the corrected green signal and the corrected blue signal; and (G) repeating the steps (A) to (F) until each pixel of the digital image is processed.

According to another feature of the invention, there is provided a system of eliminating color noises of a digital image having plural pixels by producing a corrected red signal, a corrected green signal and a corrected blue signal for each pixel, the corrected red, green and blue signals generating a first corrected chroma signal and a second corrected chroma signal. The system includes: an interpolator, which receives a target pixel and its adjacent pixels in the digital image and interpolates the target pixel and the adjacent pixels to produce a red signal, a green signal and a blue signal for each of the target and adjacent pixels; a chroma generator, which is connected to the interpolator for producing a first chroma signal and a second chroma signal based on the red signal, the green signal and the blue signal for each of the target and adjacent pixels; a filter, which is connected to the chroma generator for producing a first filtered chroma signal and a second filtered chroma signal based on the first and second chroma signals of the target pixel, the first and second chroma signals of the adjacent pixels, and the first and second corrected chroma signals of the adjacent pixels; a corrector, which is connected to the interpolator and the filter for computing the corrected red signal, the corrected green signal and the corrected blue signal for the target pixel based on the first filtered chroma signal, the second filtered chroma signal and the green signal; and an update device, which is connected to the corrector for producing the first corrected chroma signal and the second corrected chroma signal for the target pixel based on the corrected red signal, the corrected green signal and the corrected blue signal. Other objects, advantages, and novel features of the invention will become more apparent from the following detailed description when taken in conjunction with the accompanying drawings.

DETAILED DESCRIPTION OF THE PREFERRED EMBODIMENT

Figure 1:
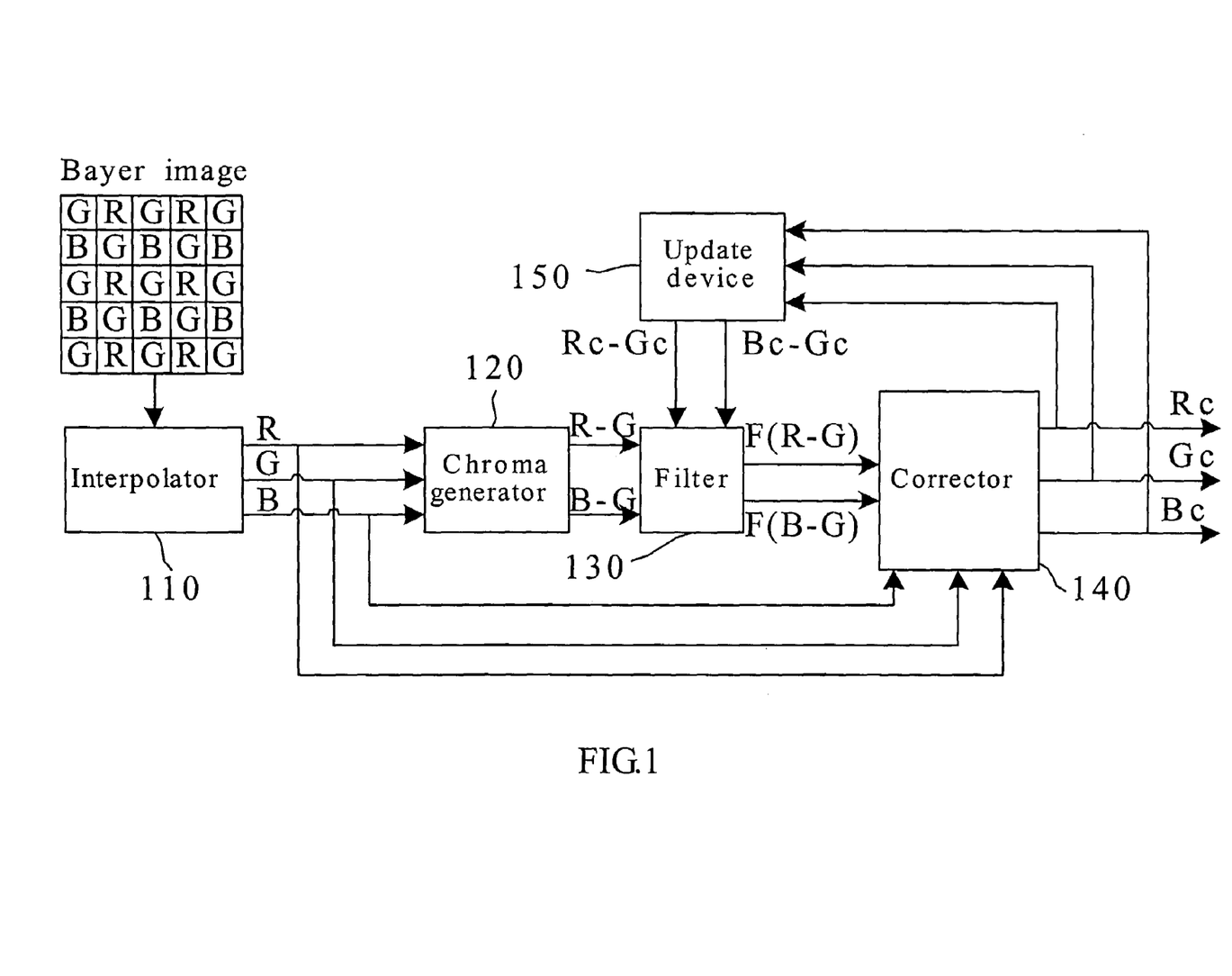
FIG. 1 is a block diagram of a system of eliminating color noises caused by an interpolation according to the invention.

FIG. 1 is a block diagram of a system of eliminating color noises caused by an interpolation according to the invention. As shown in FIG. 1, the system can eliminate color noises caused when an interpolation is performed on a digital image, to thus produce a correct red signal Rc, a correct green signal Gc and a correct blue signal Bc for a pixel (i, j). The digital image is preferably a Bayer image. The system includes an interpolator 110, a chroma generator 120, a filter 130, a corrector 140 and an update device 150.

Figure 2:
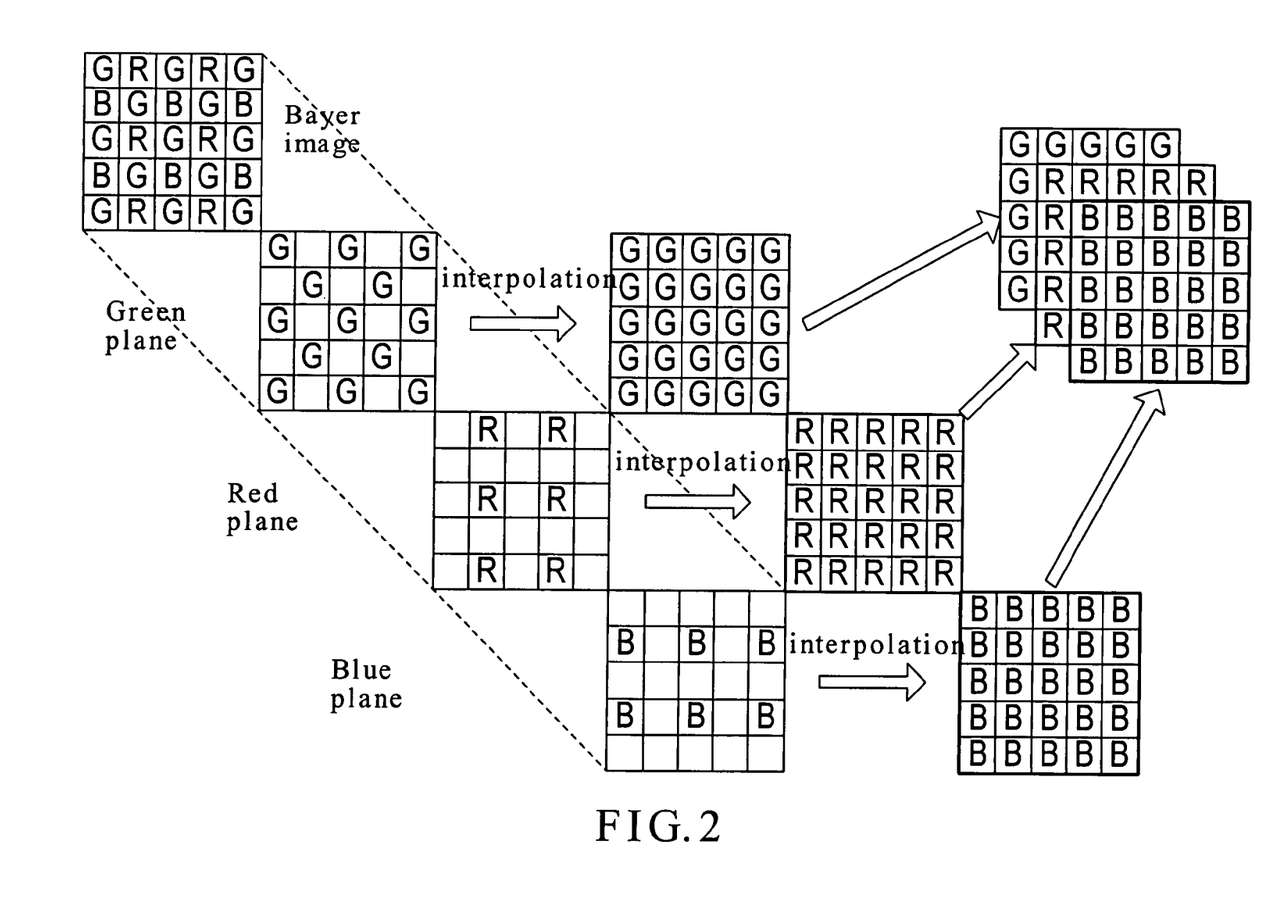
FIG. 2 is a schematic diagram of an interpolation of a Bayer image according to the invention.

The interpolator 110 receives the pixel (i, j) and its adjacent pixels in the digital image and interpolates the pixel (i, j) and the adjacent pixels to have a red signal, a green signal and a blue signal for each pixel. FIG. 2 is a schematic diagram of an interpolation of the Bayer image according to the invention. As shown in FIG. 2, the pixels are arranged interlacingly in a form of GR-based row and BG-based row. Because each pixel of the Bayer image contains only red color, green color or blue color, the interpolator 110 uses an interpolation to reconstruct missing colors for each pixel, and accordingly outputs the respective red signal, the respective green signal and the respective blue signal.

Figure 3:
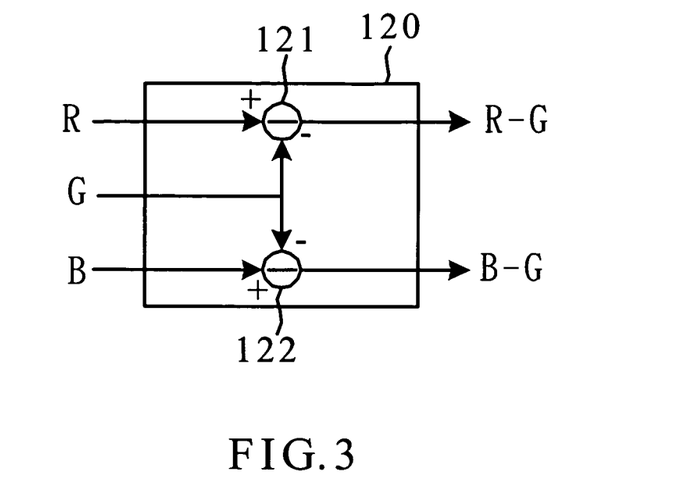
FIG. 3 is a circuit diagram of a chroma generator according to the invention.

The chroma generator 120 is connected to the interpolator 110 for producing a first chroma signal (R-G) and a second chroma signal (B-G) according to the red signal, the green signal and blue signal of a pixel such as the pixel (i, j). FIG. 3 is a circuit diagram of the chroma generator 120 according to the invention. In FIG. 3, the chroma generator 120 includes a first subtractor 121 and a second subtractor 122. The first subtractor 121 has a first input terminal to receive the red signal of pixel (i, j) and a second input terminal to receive the green signal, and subtracts its green signal from the red signal to thus obtain the first chroma signal (R-G). The second subtractor 122 has a first input terminal to receive the blue signal of pixel (i, j) and a second input terminal to receive its green signal, and subtracts the green signal from the blue signal to thus obtain the second chroma signal (B-G).

Figure 4:
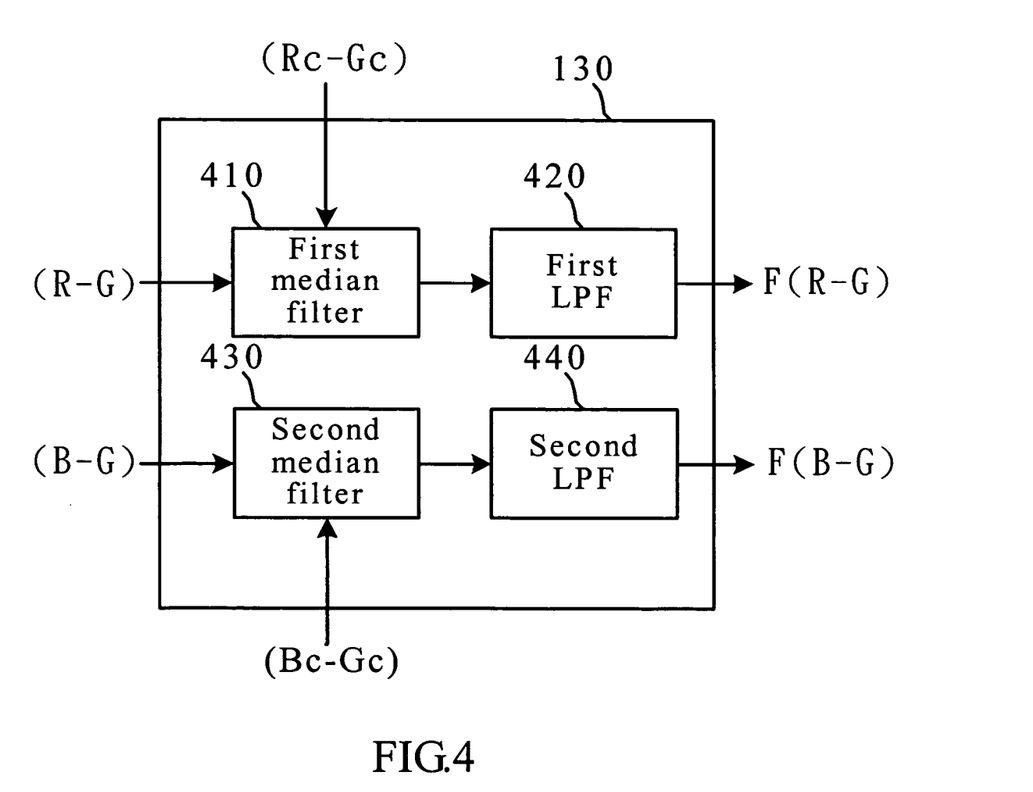
FIG. 4 is a block diagram of a filter according to the invention.

The filter 130 is connected to the chroma generator 120 for performing a filtering process on the first chroma signal (R-G) and the second chroma signal (B-G), to thus produce a first filtered chroma signal F(R-G) and a second filtered chroma signal F(B-G). FIG. 4 is a block diagram of the filter 130 according to the invention. As shown in FIG. 4, the filter 130 includes a first median filter 410, a first low pass filter (LPF) 420, a second median filter 430 and a second LPF 440.

Figure 5A:
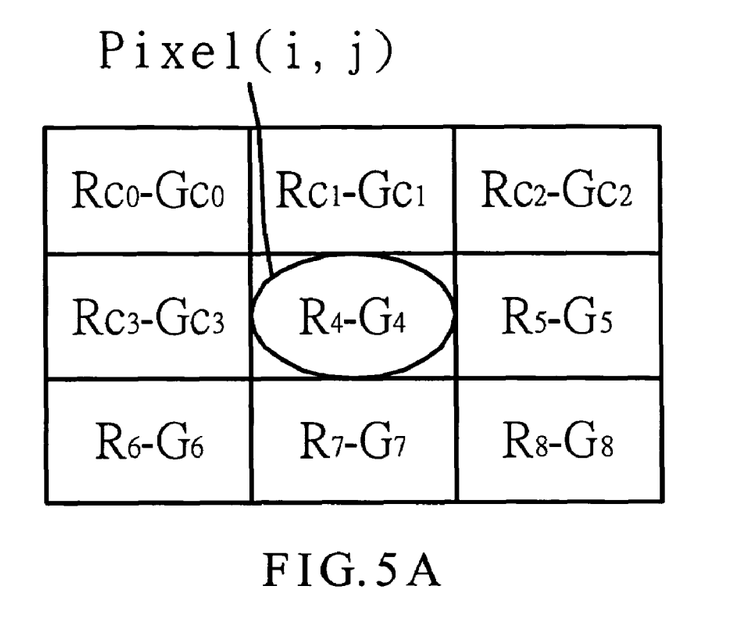
FIGS. 5A and 5B are schematic diagrams of input data of first and second median filters according to the invention.

The first median filter 410 performs a median filtering process on the first chroma signal (R-G). The first median filter 410 has one terminal to receive the first chroma signal (R-G) and the other terminal to receive a first corrected chroma signal (Rc-Gc). As shown in FIG. 5A, the first median filter 410 uses the corrected chroma signal (Rc-Gc), which is a chroma value of a pixel previously processed to eliminate color noises, to replace the original chroma value. The first median filter 410 arranges the first chroma signals (R-G) and the first corrected chroma signals (Rc-Gc) of the pixel (i, j) and adjacent pixels based on their values from small to large. For example, when the first chroma signals (R-G) and the first corrected chroma signals (Rc-Gc) of the pixel (i, j) and adjacent pixels are {135, 140, 163, 157, 160, 155, 150, 142, 140} and processed by the first median filter 410, a sequence of {135, 140, 140, 142, 150, 155, 157, 160, 163} is produced.

The first LPF 420 is connected to the first median filter 410 in order to perform a low pass filtering process on the sequence to thus produce the first filtered chroma signal F(R-G). The first LPF 420 can have a coefficient of $$\begin{bmatrix} 0 & 0 & 1 \\ 4 & 6 & 4 \\ 1 & 0 & 0 \end{bmatrix} /16.$$

Namely, after the sequence {135, 140, 140, 142, 150, 155, 157, 160, 163} is further produced by the first LPF 420, the first filtered chroma signal F(R-G) is produced to have a value of:

$$\{140 \times 1 + 142 \times 4 + 150 \times 6 + 155 \times 4 + 157 \times 1\}/16.$$

Figure 5B:
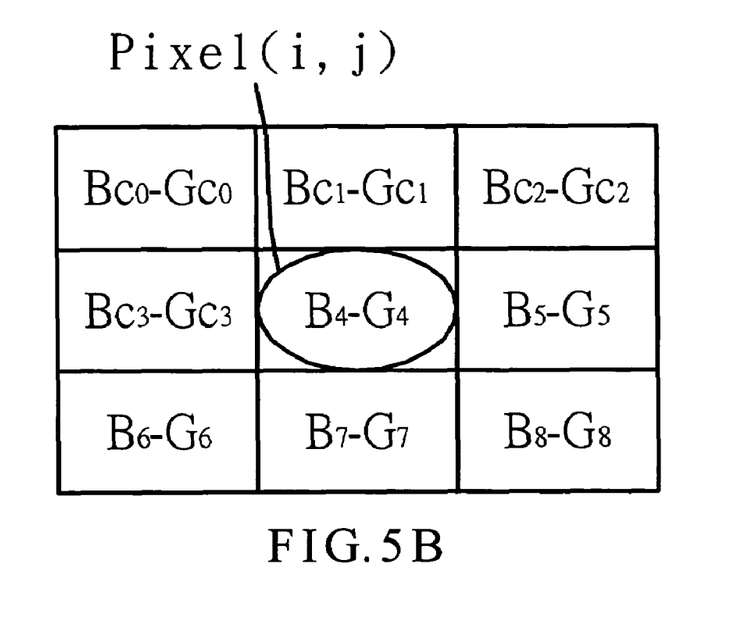

The second median filter 430 performs a median filtering process on the second chroma signal (B-G). As shown in FIG. 5B, the second median filter 430 uses the corrected chroma signal (Bc-Gc), which is a chroma value of a pixel previously processed to eliminate color noises, to replace the original chroma value. The second LPF 440 is connected to the second median filter 430 for performing a low-pass filtering on a signal processed by the median filtering to thus produce the second filtered chroma signal F(B-G).

Figure 6A:
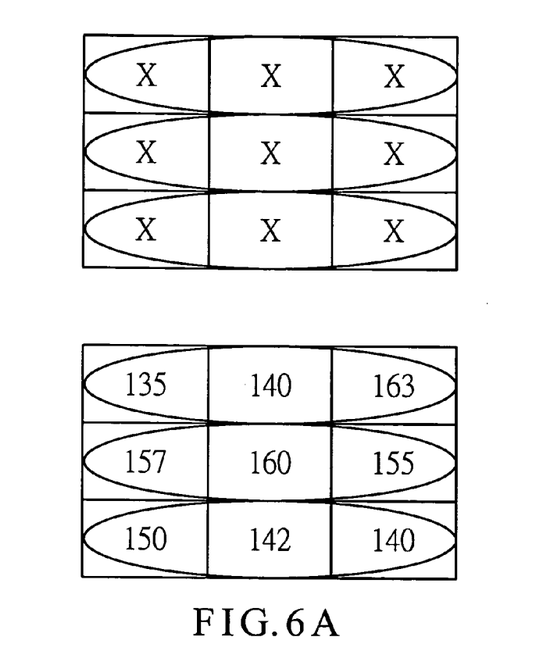
FIGS. 6A-6E are schematic diagrams of an operation of a median filter according to the invention.
Figure 6B:
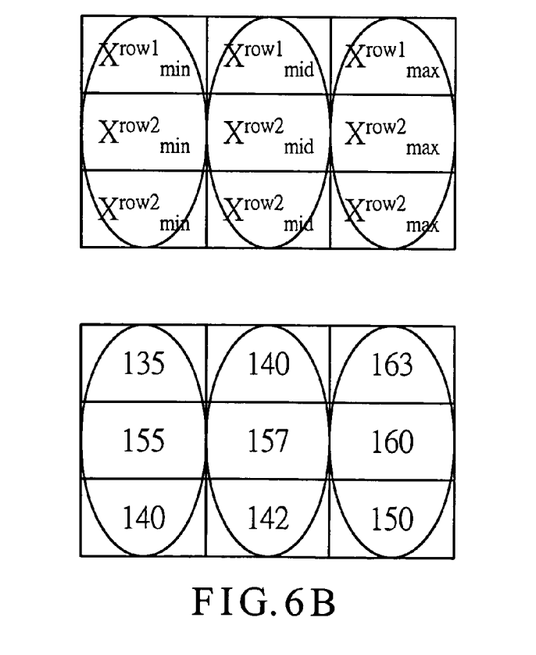
Figure 6C:
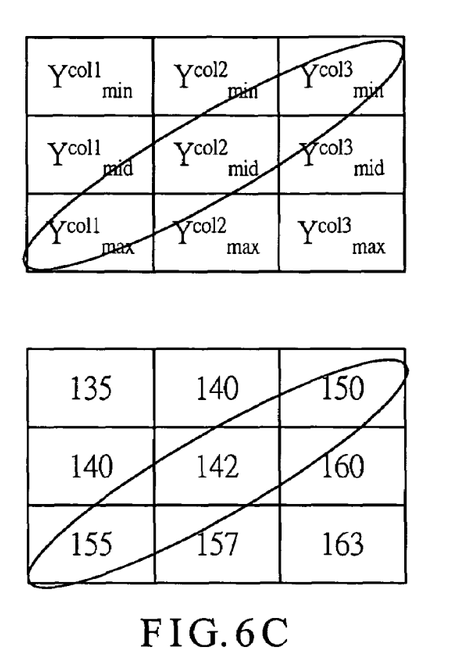
Figure 6D:
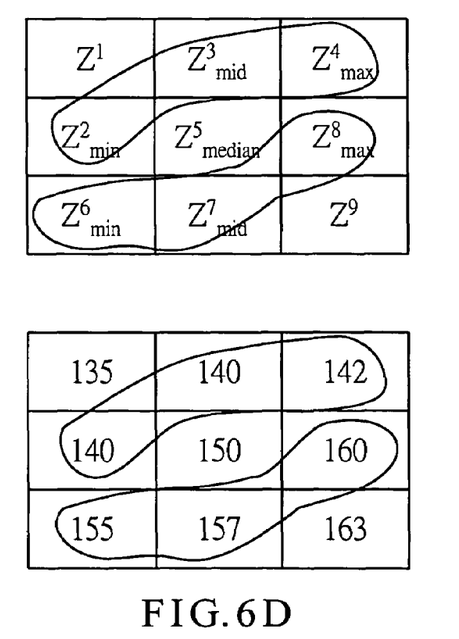
Figure 6E:
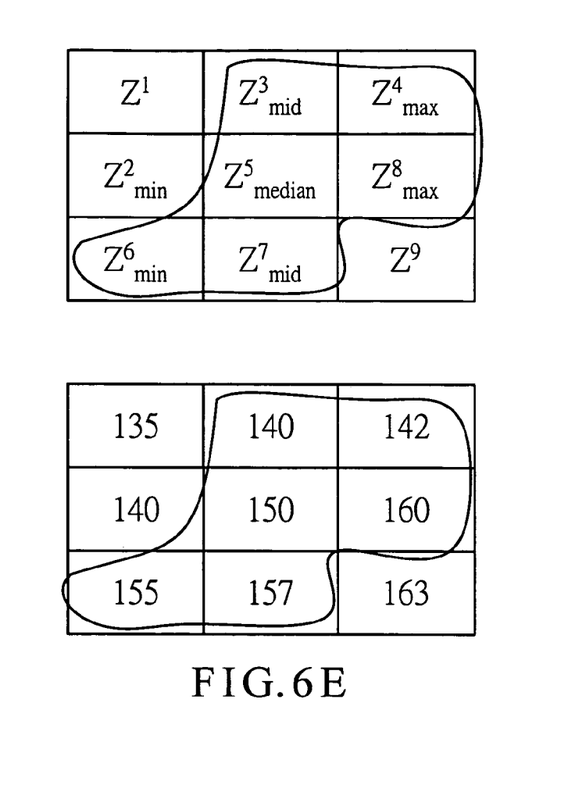

FIG. 6A-6E are schematic diagrams of an operation of a median filter according to the invention. An arrangement based on values from small to large is performed on each row of FIG. 6A (3×3=9 comparisons are required), so as to have a result shown in FIG. 6B in which the original second row, {157, 160, 155}, is changed into {155, 157, 160}, and the original third row, {150, 142, 140}, is changed into {140, 142, 150}. Next, an arrangement based on the values from small to large is performed on each column of FIG. 6B (3×3=9 comparisons are required), so as to have a result shown in FIG. 6C in which the original first column, {135, 155, 140}, is changed into {135, 140, 155}, the original second column, {140, 157, 160}, is changed into {140, 142, 157}, and the original third column, {163, 160, 150}, is changed into {150, 160, 163}. Next, an arrangement based on values from small to large is performed on a diagonal of FIG. 6C (3 comparisons are required), so as to have a result shown in FIG. 6D in which the original diagonal, {150, 142, 155}, is changed into {142, 150, 155}. Next, an arrangement based on values from small to large is performed on positions $\{Z^2, Z^3, Z^4\}$ and $\{Z^6, Z^7, Z^8\}$ of FIG. 6D (3×2=6 comparison required), so as to have a result shown in FIG. 6E in which the original positions {140, 140, 142} and {155, 157, 160} are arranged from small to large, and no change is taken. At last, an arrangement of $\{Z^3_{mid}, Z^4_{max}, Z^5_{median}, Z^6_{min}, Z^7_{mid}\}$, as shown in the upper part of FIG. 6E, is performed. As such, the median filter only compares 9+9+3+6=27 times for completing the cited operation, which is fewer than 36 (8+7+6+5+4+3+2+1) times determined by using a bubble sorting algorithm for a typical median filter.

Figure 7:
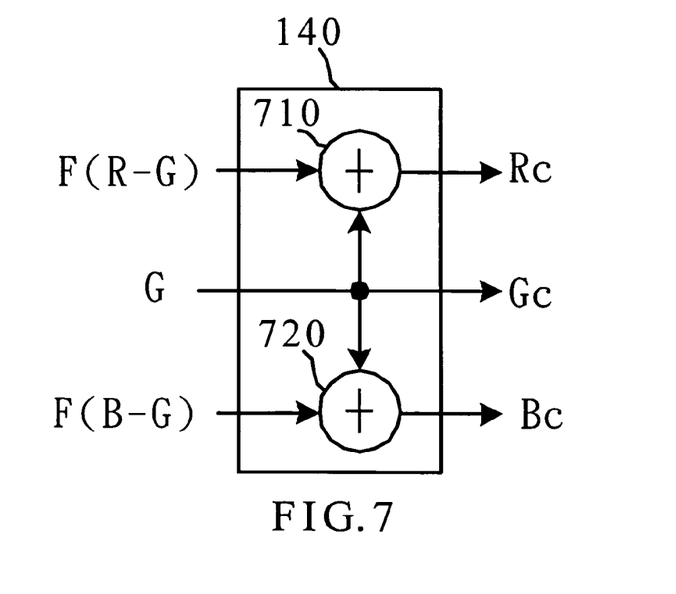
FIG. 7 is a block diagram of a corrector according to the invention.

The corrector 140 is connected to the interpolator 110 and the filter 130 to compute a corrected red signal Rc, a corrected green signal Gc and a corrected blue signal Bc for the pixel (i, j) based on the first filtered chroma signal F(R-G), the second filtered chroma signal F(B-G) and the green signal (G). FIG. 7 is a block diagram of the corrector 140 according to the invention. As shown in FIG. 7, the corrector 140 includes a first adder 710 and a second adder 720. The first adder 710 adds the first filtered chroma signal F(R-G) and the green signal (G) produced by the interpolator 110 to thus produce the corrected red signal Rc. The second adder 720 adds the second filtered chroma signal F(B-G) and the green signal (G) produced by the interpolator 110 to thus produce the corrected blue signal Bc. The corrector 140 directly produces the corrected green signal Gc according to the green signal (G) produced by the interpolator 110.

The update device 150 is connected to the corrector 140 for receiving the corrected blue signal Bc, the corrected red signal Rc and the corrected green signal Gc and accordingly producing the first corrected chroma signal (Rc-Gc) and the second corrected chroma signal (Bc-Gc).

In view of the foregoing, it is known that the invention converts the image into a chromatic domain and rapidly updates the chroma values of a pixel in the median filters with 3×3 area of 2D; namely, the chroma values {(Rc-Gc), (Bc-Gc)} of the pixel previously processed to eliminate color noises are used to replace the original chroma values {(R-G), (B-G)}. Therefore, for each 3×3 area of an image, four of nine chroma pixel values are processed to completely eliminating the color noises, so that the color filtering capability of a median filter is increased for a block with color noises of cluster, and an LPF is combined to further eliminate the uneven effect of the clustered color noises filtered out by the median filter.

Although the present invention has been explained in relation to its preferred embodiment, it is to be understood that many other possible modifications and variations can be made without departing from the spirit and scope of the invention as hereinafter claimed.

What is claimed is:

1. A method of eliminating color noises of a digital image having plural pixels by producing a corrected red signal, a corrected green signal and a corrected blue signal for each pixel, the corrected red signal, the corrected green signal and the corrected blue signal generating a first corrected chroma signal and a second corrected chroma signal, the method comprising the steps of:
    (A) receiving a target pixel and its adjacent pixels in the digital image;
    (B) interpolating the target pixel and the adjacent pixels to produce a red signal, a green signal and a blue signal for each of the target and adjacent pixels;
    (C) producing a first chroma signal and a second chroma signal based on the red signal, the green signal and the blue signal for each of the target and adjacent pixels;
    (D) performing a median filtering and a low pass filtering process to thus produce a first filtered chroma signal and a second filtered chroma signal based on the first and second chroma signals of the target pixel, the first and second chroma signals of the adjacent pixels, and the first and second corrected chroma signals of the adjacent pixels wherein each of the first and second corrected chroma signals of the adjacent pixels is a chroma value of the adjacent pixels of which color noises have been eliminated;
    (E) computing the corrected red signal, the corrected green signal and the corrected blue signal for the target pixel based on the first filtered chroma signal, the second filtered chroma signal and the green signal;
    (F) producing the first corrected chroma signal and the second corrected chroma signal for the target pixel based on the corrected red signal, the corrected green signal and the corrected blue signal; and
    (G) repeating the steps (A) to (F) until each pixel of the digital image is processed.

2. The method as claimed in claim 1, wherein a value of the first chroma signal in step (C) is obtained by subtracting a value of the green signal of the target pixel from a value of the red signal of the target pixel.

3. The method as claimed in claim 2, wherein a value of the second chroma signal in step (C) is obtained by subtracting a value of the green signal of the target pixel from a value of the blue signal of the target pixel.

4. The method as claimed in claim 1, wherein step (E) adds the first filter chroma signal and the green signal to thus produce the corrected red signal.

5. The method as claimed in claim 4, wherein step (E) adds the second filter chroma signal and the green signal to thus produce the corrected blue signal.

6. A system of eliminating color noises of a digital image having plural pixels by producing a corrected red signal, a corrected green signal and a corrected blue signal for each pixel, the corrected red signal, the corrected green signal and the corrected blue signal generating a first corrected chroma signal and a second corrected chroma signal, the system comprising:
    an interpolator, which receives a target pixel and its adjacent pixels in the digital image and interpolates the target pixel mad the adjacent pixels to produce a red signal, a green signal and a blue signal for each of the target and adjacent pixels;
    a chroma generator, which is connected to the interpolator for producing a first chroma signal and a second chroma signal based on the red signal, the green signal and the blue signal for each of the target and adjacent pixels;
    a filter, which is connected to the chroma generator for producing a first filtered chroma signal and a second filtered chroma signal by a median filtering and a low pass filtering process based on the first and second chroma signals of the target pixel, the first and second chroma signals of the adjacent pixels, and the first and second corrected chroma signals of the adjacent pixels, wherein each of the first and second corrected chroma signals of the adjacent pixels is a chroma value of the adjacent pixels of which color noises have been eliminated;
    a corrector, which is connected to the interpolator and the filter for computing the corrected red signal, the corrected green signal and the corrected blue signal for the target pixel based on the first filtered chroma signal, the second filtered chroma signal and the green signal; and
    an update device, which is connected to the corrector for producing the first corrected chroma signal and the second corrected chroma signal for the target pixel based on the corrected red signal, the corrected green signal and the corrected blue signal.

7. The system as claimed in claim 6, wherein the chroma generator comprises a first subtractor to subtract a value of the green signal of the target pixel from a value of the red signal of the target pixel to thus obtain the first chroma signal.

8. The system as claimed in claim 7, wherein the chroma generator further comprises a second subtractor to subtract a value of the green signal of the target pixel from a value of the blue signal of the pixel to thus obtain the second chroma signal.

9. The system as claimed in claim 6, wherein the filter further comprises:
    A second median filter, which performs a median filter on the second filter chroma signal; and
    A second low pass filter, which is connected to the second median filter in order to perform a low pass filtering on a media-filtered signal output by the second median filter to thus produce the second filtered chroma signal.

10. The system as claimed in claim 6, wherein the corrector comprises a first adder to add the first filtered chroma signal and the green signal to thus produce the corrected red signal.

11. The system as claimed in claim 10, wherein the corrector further comprises a second adder to add the second filtered chroma signal and the green signal to thus produce the corrected blue signal.

* * * * *

UNITED STATES PATENT AND TRADEMARK OFFICE
CERTIFICATE OF CORRECTION

PATENT NO. : 7,609,300 B2  Page 1 of 1
APPLICATION NO. : 11/408990
DATED : October 27, 2009
INVENTOR(S) : Cheng-Yu Wu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this

Eighteenth Day of January, 2011

David J. Kappos
*Director of the United States Patent and Trademark Office*